United States Patent
Kanga et al.

(10) Patent No.: US 11,978,180 B2
(45) Date of Patent: May 7, 2024

(54) SYSTEM AND A METHOD FOR PROCESSING AN IMAGE

(71) Applicant: IQ Works Limited, Chai Wan (HK)

(72) Inventors: Rustom Adi Kanga, Pok Fu Lam (HK); Lai Chun Li, Pok Fu Lam (HK)

(73) Assignee: IQ Works Limited, Chai Wan (HK)

( * ) Notice: Subject to any disclaimer, the term of this patent is extended or adjusted under 35 U.S.C. 154(b) by 504 days.

(21) Appl. No.: 17/324,203

(22) Filed: May 19, 2021

(65) Prior Publication Data
US 2021/0390663 A1  Dec. 16, 2021

(30) Foreign Application Priority Data
Jun. 15, 2020  (HK) ............................ 32020009268.4

(51) Int. Cl.
| G06T 5/00 | (2006.01) |
| G06F 21/62 | (2013.01) |
| H04N 7/167 | (2011.01) |

(52) U.S. Cl.
CPC ............ *G06T 5/00* (2013.01); *G06F 21/6245* (2013.01); *H04N 7/1675* (2013.01)

(58) Field of Classification Search
CPC ........ G06N 3/084; G06N 20/20; G06Q 10/08; G06Q 10/063; G06V 20/1188; G06V 10/774
See application file for complete search history.

(56) References Cited

U.S. PATENT DOCUMENTS

| 6,714,317 | B2 * | 3/2004 | Lu | ...................... H04N 1/00384 358/475 |
| 7,447,332 | B2 * | 11/2008 | Horii | ...................... G06V 20/10 382/103 |
| 8,306,221 | B2 * | 11/2012 | Takahashi | ............ H04N 1/4486 380/54 |
| 8,515,062 | B2 * | 8/2013 | Nakagata | ................. G09C 5/00 380/54 |
| 9,070,182 | B1 * | 6/2015 | Chua | ..................... H04L 65/403 |
| 9,152,810 | B2 * | 10/2015 | Inami | ................... H04N 1/4413 |
| 9,684,987 | B1 * | 6/2017 | Dhua | ................... G06T 11/001 |
| 9,798,928 | B2 * | 10/2017 | Carr | ..................... G01C 11/025 |
| 10,515,242 | B2 * | 12/2019 | Otis | ...................... A61B 5/682 |

(Continued)

OTHER PUBLICATIONS

Hindawi Publishing Corportation; Journal of Electrical and Computer Engineering; vol. 2012, Article ID 173931, 13 pages; doi: 10.1155/2012/173931; A Secure Image Encryption Algorithm Based on Rubik's Cube Priniciple; K. Loukhaoukha et al.

(Continued)

*Primary Examiner* — Yosef Kassa
(74) *Attorney, Agent, or Firm* — Renner, Kenner, Greive, Bobak, Taylor & Weber

(57) ABSTRACT

A system and a method for processing an image. The method includes the steps of: receiving a source image having at least one sensitive portions arranged to present intelligible sensitive information; and processing, with a predetermined redacting method, the at least one sensitive portions of the source image to generate an output image including the intelligible sensitive information being transformed into an unintelligible form; wherein the sensitive information in the unintelligible form is adapted to be restored to an intelligible form.

22 Claims, 4 Drawing Sheets

(56) References Cited

U.S. PATENT DOCUMENTS 10,563,958 B2 * 2/2020 Kazemi .................... F41H 3/00
2017/0147828 A1 5/2017 Kurian et al.

OTHER PUBLICATIONS

International Journal of Electrical and Computer Engineering 1:2 2006; A New Image Encryption Approach using Combinational Permutation Techniques; A. Mitra et al.
Communication pursuant to Article 94(3) EPC, Office action in copending European Patent Application, dated Jan. 5, 2024.

\* cited by examiner

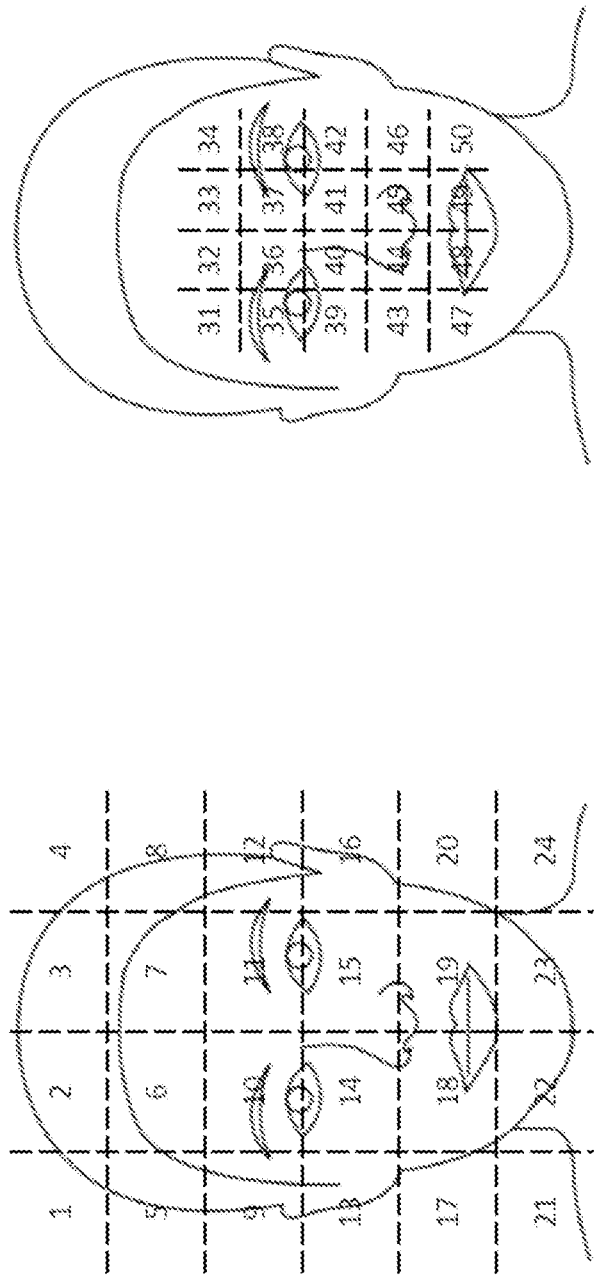
FIG. 3A
FIG. 3B
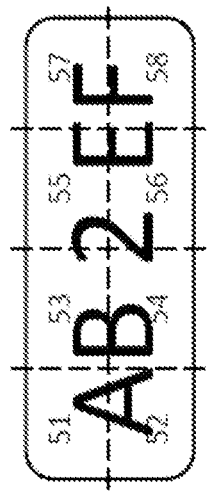
FIG. 3C

SYSTEM AND A METHOD FOR PROCESSING AN IMAGE

TECHNICAL FIELD

The present invention relates to a system and a method for processing an image, and particularly, although not exclusively, to a system and method for redacting sensitive information on an image.

BACKGROUND

Image redaction may be applied to protect sensitive data on images or documents. For example, in security surveillance applications, redaction of camera streams may be performed to mask license plates and/or people's faces so as to protect the identity of these subjects. In some countries, this has to be done to comply with regional privacy laws. In another common application, image redaction may be performed to obscure sensitive imagery or information.

SUMMARY OF THE INVENTION

In accordance with a first aspect of the present invention, there is provided a method for processing an image comprising the steps of: receiving a source image having at least one sensitive portions arranged to present intelligible sensitive information; processing, with a predetermined redacting method, the at least one sensitive portions of the source image to generate an output image including the intelligible sensitive information being transformed into an unintelligible form; wherein the sensitive information in the unintelligible form is adapted to be restored to an intelligible form.

In an embodiment of the first aspect, the step of processing the at least one sensitive portions of the source image includes scrambling the at least one sensitive portions such that the intelligible sensitive information becomes unintelligible.

In an embodiment of the first aspect, the sensitive information in the unintelligible form is adapted to be restored to the intelligible form by reverse-scrambling the at least one sensitive portions in the output image.

In an embodiment of the first aspect, each of the at least one sensitive portions includes a plurality of partitions each include at least one image pixel.

In an embodiment of the first aspect, the plurality of partitions combine to form an array.

In an embodiment of the first aspect, the step of processing the at least one sensitive portions of the source image further comprising the step of recording a scrambling arrangement of a plurality of image pixels associated with each of the at least one sensitive portions.

In an embodiment of the first aspect, the scrambling arrangement is embedded in the output image.

In an embodiment of the first aspect, the scrambling arrangement is encrypted.

In an embodiment of the first aspect, the scrambling arrangement is stored in metadata or header of the output image.

In an embodiment of the first aspect, the method further comprises the step of processing a plurality of source images each including the intelligible sensitive information presented on the at least one sensitive portions of each of the source image, wherein the plurality of source images are arranged to combine as a stream of image frames.

In an embodiment of the first aspect, the step of processing the at least one sensitive portions of the source image includes scrambling the at least one sensitive portions on different source images with different scrambling arrangements.

In an embodiment of the first aspect, the method further comprises the step of encrypting a scrambling arrangement associated with each of the image frames using a plurality of unique encryption keys.

In an embodiment of the first aspect, the method further comprises the step of identifying the at least one sensitive portions in the source image.

In an embodiment of the first aspect, the intelligible sensitive information includes an identification feature of an object.

In accordance with a second aspect of the present invention, there is provided a method of restoring an image processed by the method of the first aspect, comprising the step of: retrieving a scrambling arrangement of the plurality of image pixels associated with each of the at least one sensitive portions; and reverse-scrambling the at least one sensitive portions in the output image so as to present the sensitive information in the intelligible form.

In an embodiment of the second aspect, the method further comprises the step of authenticating a user so as to process the steps of retrieving the scrambling arrangement and/or reverse-scrambling the at least one sensitive portions in the output image upon a valid authentication.

In accordance with a third aspect of the present invention, there is provided an image processing system comprising: an image processing module arranged to process at least one sensitive portions of a source image with a predetermined redacting method, wherein the at least one sensitive portion is arranged to present intelligible sensitive information; and a redacted image generation module arranged to generate an output image including the intelligible sensitive information being transformed into an unintelligible form; wherein the sensitive information in the unintelligible form is adapted to be restored to an intelligible form.

In an embodiment of the third aspect, the image processing module is arranged to scramble the at least one sensitive portions such that the intelligible sensitive information becomes unintelligible.

In an embodiment of the third aspect, the sensitive information in the unintelligible form is adapted to be restored to the intelligible form by reverse-scrambling the at least one sensitive portions in the output image.

In an embodiment of the third aspect, each of the at least one sensitive portions includes a plurality of partitions each include at least one image pixel.

In an embodiment of the third aspect, the plurality of partitions combine to form an array.

In an embodiment of the third aspect, the redacted image generation module is further arranged to record a scrambling arrangement of a plurality of image pixels associated with each of the at least one sensitive portions.

In an embodiment of the third aspect, the scrambling arrangement is embedded in the output image.

In an embodiment of the third aspect, the scrambling arrangement is encrypted.

In an embodiment of the third aspect, the scrambling arrangement is stored in metadata or header of the output image.

In an embodiment of the third aspect, the image processing module is arranged to process a plurality of source images each including the intelligible sensitive information presented on the at least one sensitive portions of each of the source image, wherein the plurality of source images are arranged to combine as a stream of image frames.

In an embodiment of the third aspect, the image processing module is arranged to scramble the at least one sensitive portions on different source images with different scrambling arrangements.

In an embodiment of the third aspect, the redacted image generation module is further arranged to encrypt a scrambling arrangement associated with each of the image frames using a plurality of unique encryption keys.

In an embodiment of the third aspect, the image processing module is arranged to identify the at least one sensitive portions in the source image.

In an embodiment of the third aspect, the intelligible sensitive information includes an identification feature of an object.

In accordance with a fourth aspect of the present invention, there is provided an image viewer arranged to restore an image processed by the image processing system of the third aspect, wherein the image viewer comprise a reverse-redacting module arranged to retrieve a scrambling arrangement of the plurality of image pixels associated with each of the at least one sensitive portions, and to reverse-scramble the at least one sensitive portions in the output image so as to present the sensitive information in the intelligible form.

In an embodiment of the fourth aspect, the image viewer further comprises an authorization module arranged to authenticate a user so as to enable the reverse-redacting module to retrieve the scrambling arrangement and/or to reverse-scramble the at least one sensitive portions in the output image upon a valid authentication.

BRIEF DESCRIPTION OF THE DRAWINGS

Embodiments of the present invention will now be described, by way of example, with reference to the accompanying drawings in which:

FIGS. 3A to 3C are illustrations showing examples sensitive portions that present intelligible sensitive information.

DETAILED DESCRIPTION OF THE PREFERRED EMBODIMENT

The inventors have, through their own research, trials and experiments, devised that while there are several techniques available in computer-vision algorithms to redact images, this redaction is considered permanent and not removable. This is because the redaction process is done by replacing the original pixels of the image data so as to obscure the image data. This may be performed by replacement with alternative pixels or smudging out portions of the image data.

In one preferred embodiment, the present invention provides a unique reversible redacting method which allows the redaction to be reversed when required. Preferably, the method utilizes jumble blocks of the sensitive portions of an image with a unique code, so that when the code is reapplied to reverse the jumbled blocks the original image is restored.

This embodiment may conceptually be similar to how a rubik's cube is scrambled and then solved.

Figure 1:
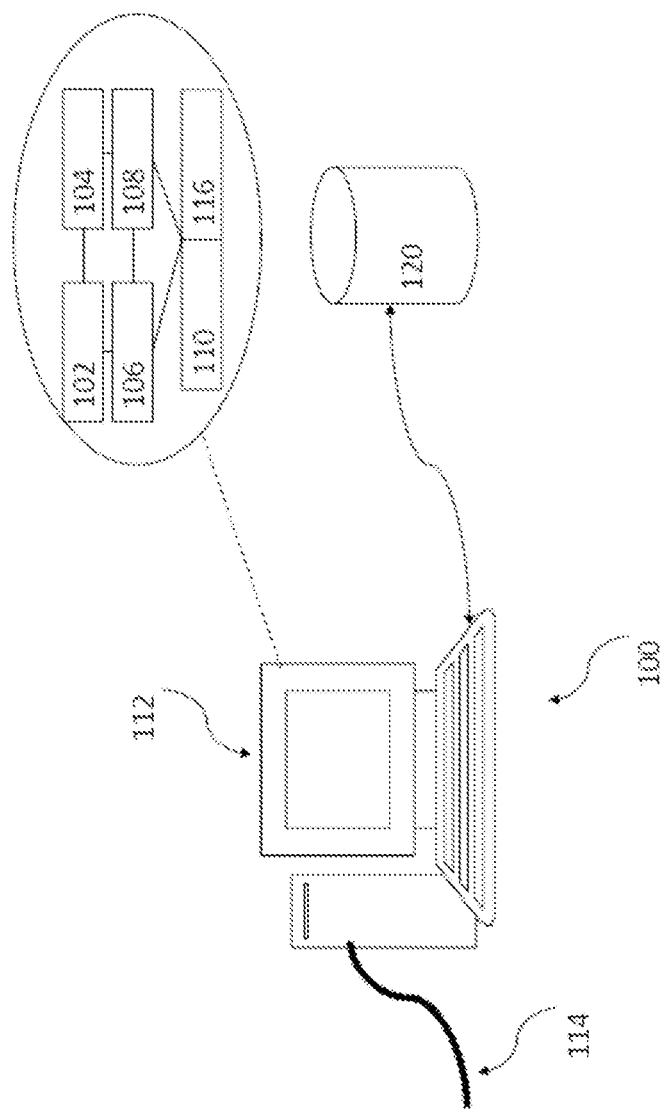
FIG. 1 is a schematic diagram of a computing server for operation as a system for use in processing an image in accordance with one embodiment of the present invention.

With reference to FIG. 1, an embodiment of the present invention is illustrated. This embodiment is arranged to provide an image processing system comprising: an image processing module arranged to process at least one sensitive portions of a source image with a predetermined redacting method, wherein the at least one sensitive portion is arranged to present intelligible sensitive information; and a redacted image generation module arranged to generate an output image including the intelligible sensitive information being transformed into an unintelligible form; wherein the sensitive information in the unintelligible form is restorable or adapted to be restored to an intelligible form.

This embodiment is further arranged to provide an image viewer comprising a reverse-redacting module arranged to retrieve a scrambling arrangement of the plurality of image pixels associated with each of the at least one sensitive portions, and to reverse-scramble the at least one sensitive portions in the output image so as to present the sensitive information in the intelligible form.

Preferably, in one example, the system may be used to identify sensitive information, such as number plates and human faces, presented on the source image, and to generate an output image with the sensitive information being "masked" using a reversible redaction method, such that the sensitive information is not intelligible unless the output image is to be further processed to restore the masked portion of the image using a reversal or a restoring processing method provided in a specifically implemented or proprietary image viewer.

In this embodiment, the image processing module, the redacted image generation module and/or the reverse-redacting module are implemented by or for operation on a computer having an appropriate user interface. The computer may be implemented by any computing architecture, including stand-alone PC, client/server architecture, "dumb" terminal/mainframe architecture, or any other appropriate architecture. The computing device may be appropriately programmed to implement the invention.

Referring to FIG. 1, there is shown a schematic diagram of a computer or a computing server 100 which in this embodiment comprises a server 100 arranged to operate, at least in part if not entirely, the system for use in processing images in accordance with one embodiment of the invention. The server 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The server may include storage devices such as a disk drive 108 which may encompass solid state drives, hard disk drives, optical drives or magnetic tape drives. The server 100 may use a single disk drive or multiple disk drives. The server 100 may also have a suitable operating system 116 which resides on the disk drive or in the ROM of the server 100.

The system has a database 120 residing on a disk or other storage device which is arranged to store at least one record 122. The database 120 is in communication with the server 100 with an interface, which is implemented by computer software residing on the server 100.

Alternatively, the database 120 may also be implemented as a stand-alone database system in communication with the server 100 via an external computing network, or other types of communication links.

Figure 2:
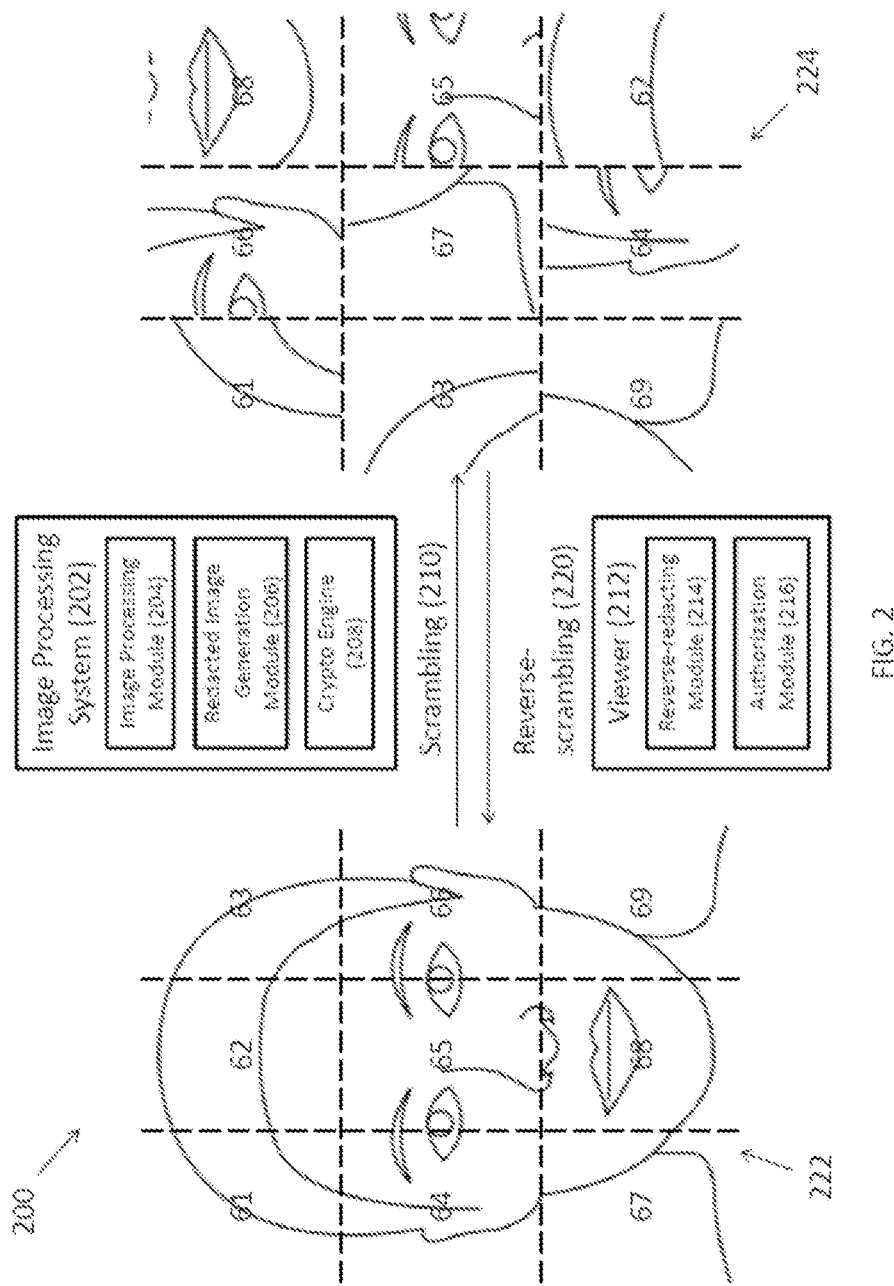
FIG. 2 is an illustration of an image processing system and an image viewer that may be implemented by the computing server of FIG. 1.

With reference to FIG. 2, there is shown an embodiment of the system 200 for use in processing and/or viewing images. In this embodiment, the system 200 is used to process a source image 222 and generate an output image 224 with at least a portion of the source image being edited or redacted, for example, the human face presented on the source image 222 is transformed to an unintelligible form as presented on the output image 224.

With reference also FIGS. 3A to 3C, there is shown three examples of images with different sensitive portions presenting with intelligible sensitive information, such as identification features of an object or a target. For example, one may consider that the entire area showing the face of an individual is the sensitive portion therefore the entire face as shown in grids 1-24 in FIG. 3A has to be masked or redacted such that the identity of the individual is unrecognisable. Alternatively, one may instead consider that only the area with facial features on the face of an individual is the sensitive portion therefore only the center portion of the face as shown in grids 31-50 in FIG. 3B has to be masked or redacted such that the identity of the individual is unrecognisable.

In an alternative example with reference to FIG. 3C, sensitive information may be a combination of alphanumeric characters which may represent an identity of an object. This may include a name or an identity number recorded on an identity card of an individual, a name and address of certain premises, or a number plate associated with a vehicle. Referring to FIG. 3C, the identity of these objects may become unrecognisable by masking a part or all of the alphanumeric characters being presented, such as grids 51-58 in FIG. 3C, in which the text string "AB 2 EF" will become non-readable after grids 51-58 are redacted.

Now referring back to FIG. 2, the source image 222 may be provided to the image processing system 202 to redact the face presented on the image 222. Preferably, the image processing module 204 may process the image 222 using a predetermined redacting method 210, such as scrambling the sensitive portion (in this example the entire image 222) to transform the intelligible sensitive information to become unintelligible.

In this example, the entire source image 222 is partitioned into nine partitions (or blocks) 61-69 which combine to form a 3×3 array, and each of the partitions includes multiple pixels. It should be appreciated by a skilled person in the art that the size and dimension of the array may be different in other examples, such as 4×6 or 4×5 as shown in FIGS. 3A and 3B, and the size of each of the partitions may also be different. For example, the size of each partition may include one single pixel, which means that the dimension of the partition array may be identical to the pixel dimension of the image or the redacted portion of the image.

After scrambling the image 222 or the sensitive portions of the image 222, the redacted image generation module 206 may generate an output image which includes the sensitive information in the unintelligible (or scrambled) form. Preferably, when generating the output image, the redacted image generation module 206 may also record a scrambling arrangement of the image pixels associated with sensitive portions such that by using the recorded scrambling arrangement, the sensitive information in the unintelligible form may be restored to the intelligible (or original) form by reverse-scrambling the sensitive portions in the output image 224 generated by the redacted image generation module 206.

For example, referring to FIG. 2, the scrambling arrangement may be recorded as 61-66-68-63-67-65-69-64-62 as shown on the output image 224, such in the reverse-scrambling process 220, the reverse-redacting module 214 of the image viewer 212 may rearrange the positions of these partitions or blocks of the output image 224 back to the original arrangement, i.e. sequentially 61-69 from left to right and top to bottom, as shown in the source image 222, such that the original representation may be restored to reveal the sensitive information.

In this disclosure, the terms "scramble" and "scrambling" mean arranging the plurality of pixels or partitions of the target area of an image based on an arrangement different from the original one, and the term "reverse-scrambling" means once again arranging these pixels or partitions, based on a reversal of such an arrangement in the scrambling process, so as to revert the previously performed scrambling of these pixels or partitions. The inventor may also refer such scrambling process as a "code-block jumbling" process.

Preferably, the scrambling arrangement may be embedded in the output image 224 generated by the redacted image generation module 206, in the form of metadata or header of the output image 224. Alternatively, the scrambling arrangement may be stored as a separate data file with a file association with the output image 224 or multiple output images. Yet alternatively, the scrambling arrangement may be requested and retrieved only when necessary from a remote repository, to further enhance the security and integrity of the redacted information.

It is also possible that the both image processing module 204 and the reverse-redacting module 214 are pre-programmed to process the images with one or more predefined scrambling arrangements such that further recording of the scrambling arrangement become unnecessary in some example embodiments.

Optionally or additionally, to further enhance the security and integrity of the redacted information, the scrambling arrangement is encrypted, e.g. by using a crypto engine 208 in the image processing system 202 which may encrypt the scrambling arrangement, such that the viewer 212 may perform the reverse-scrambling process after unlocking the retrieved encrypted scrambling arrangement using the associated encryption key.

In addition, the image viewer 212 may further comprise an authorization module 216 which authenticates a user so as to enable the reverse-redacting module 214 to retrieve the scrambling arrangement and/or to reverse-scramble the at least one sensitive portions in the output image 224 upon a valid authentication. Advantageously, this ensures that redacted sensitive information is not disclosed to unauthorized individuals even though they may have the access to the proprietary image viewer 212 and/or the processed output images 224.

Figure 4:
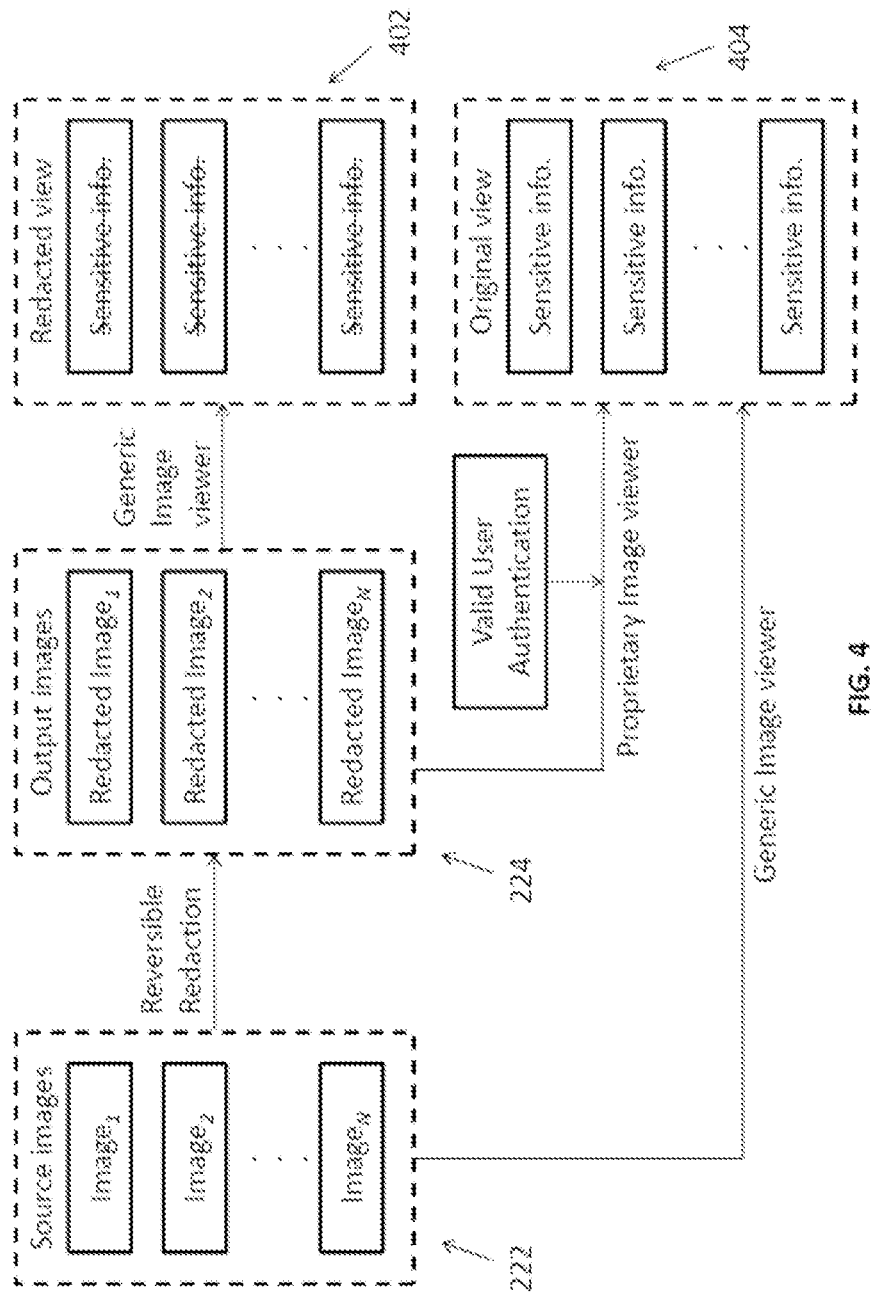
FIG. 4 is a block diagram showing an operation of the image processing system and the image viewer of FIG. 2.

With reference also to FIG. 4, in another example embodiment, the image processing system 202 may also be used to process multiple image 222, wherein images (image$_1$-image$_N$) are arranged to combine as a stream of image frames, and may be playback as a video stream. In this example, each of the source image frames (1-N) includes the same or different sensitive information and will be scrambled using the redacting method described earlier in this disclosure.

Preferably, each of the source image frames 222 may be processed using different scrambling arrangements so as to further minimized the risk that the sensitive information in all the image frames being hacked easily. Alternatively, the scrambling arrangements may change at a predetermined time interval, e.g. every 1000 frames, based on different designs of the image processing module 204 and/or the playback module. In addition, the redacted image generation module 206 may encrypt the respective scrambling arrangement associated with each of the image frames using a plurality of unique encryption keys to further protect the sensitive information, although it is also possible that the same encryption key may be used for encrypting the same or different scrambling arrangements for all image frames, or the encryption key used may change at a predetermined time interval in other designs.

In one preferable embodiment, the reversible redacting method enables redaction in two main objects in surveillance camera video stream, namely human face and vehicle number plate. Optionally, the image processing module 204 may be implemented to identify the objects in these sensitive portions in the source image, for example, by using an AI-based object recognition module to identify the target area of the image to be processed by the reversible redacting method. Alternatively, the object of interest, such as human faces or vehicle number plates, may be detected using other computer vision techniques.

Once this is done, the image coordinates of these objects may be enclosed in a polygon, such as but not limited to, a rectangle or a square. This polygon is then divided into blocks which are interchanged to a unique code that is unique code per customer or user. This code then becomes the key by which the image is redacted.

For example, image portions showing a face or a number plate may be cropped from the source image of a video stream. The object in the image may be divided into multiple partitions/blocks, such as 16 or 8 blocks. The number of blocks each object may be divided decides the complexity of the redaction process and may be user configurable. Once the object is divided into blocks, the blocks may be rearranged in a certain unique order per image. The jumbled blocks are then altered the stitched back on the original image.

The order in which the objects are rearranged for the image may then be stored in the metadata of that image which is then embedded as the frame data and encoded as a video stream. The encoded video stream may be ONVIF compliant stream and can be used similar to any camera stream supplied by most ONVIF conformant video management systems or NVRs in some example applications.

Although the encoded video stream is ONVIF conformant and can be used by any VMS or NVR system, to reverse the redaction the video must be passed back to a proprietary video player. Otherwise, referring to FIG. 4, a generic image/video viewer may only be able to produce a representation of the process output images 224 with a "redacted view" 404 with the sensitive information, such as the human faces and/or number plates remains redacted.

When the encoded redacted images/video 224 is passed through the proprietary image viewer 212 or video player, the player decodes the video into individual frames, and then reads the frame's metadata that contains the unique code to retrieve the recorded scrambling arrangement. Using the unique code, the order in which the blocks are arranged is determined and the blocks are reversed in order. The reversing process restores the original view 402 of the image, which is converted to an encoded video frame. The video may then be rendered in the player for the user to see without redaction. The original view 402 of the image or the video stream should be the same or at least not substantially different from the view produced by a generic image viewer that renders the source image(s) 222 without being processed by the redaction method.

To further enhance the data security, similar to the redaction and reversing process, the data security process handled by in both the above processes may also be unique. The encoding process after redaction and also the data retrieving process by the video player before reversing the data may be digitally protected. The secure data handling during the entire process may involve one or more of the following example operations:

I. The number of blocks dividing the object in the image may be variable and configurable. This allows the jumbling of blocks more complex according to user's consideration of data sensitivity.

II. The order of jumbling the blocks may be encrypted using AES 256 and the encrypted key may be stored in the header of same frame. This means the encrypted data can only be decrypted by a known system or image viewer, such as the proprietary player.

III. The encryption key may be varied every frame, because the order in which the blocks are jumbled may be changed every frame. The encrypted key may also be unique to every frame. This means, even if one frame is hacked the user may not be able to decrypt another frame easily.

IV. Although the redacted video may be consumed by open network standards, the reversing process is controlled only by proprietary player. This limits the software availability only to authorised users.

V. The video player may be provided with features of authorised user management, tokenised functions after authentication making the stream more secured.

These embodiments may be advantageous in that the reversible redaction method may be applied to any image or video stream and not restricted to surveillance video streams, and provides an effective way to enable conversions of sensitive information between an intelligible form and an unintelligible form without sacrificing the details of the redacted portions of the image.

Advantageously, the method may be used in different applications, such as but not limited to, real-time redaction of surveillance camera video streams, recorded video archives, general video evidences for regulatory firms, video evidences collected for law-enforcement agencies, social media video content and main stream media platforms.

It will also be appreciated that where the methods and systems of the present invention are either wholly implemented by computing system or partly implemented by computing systems thus any appropriate computing system architecture may be utilised. This will include standalone computers, network computers and dedicated hardware devices. Where the terms "computing system" and "computing device" are used, these terms are intended to cover any appropriate arrangement of computer hardware capable of implementing the function described.

It will be appreciated by persons skilled in the art that the term "database" may include any form of organized or unorganized data storage devices implemented in either software, hardware or a combination of both which are able to implement the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for processing an image comprising the steps of:
   receiving a source image having at least one sensitive portions arranged to present intelligible sensitive information; and
   processing, with a predetermined redacting method, the at least one sensitive portions of the source image to generate an output image including the intelligible sensitive information being transformed into an unintelligible form;
   wherein the sensitive information in the unintelligible form is adapted to be restored to an intelligible form; and
   wherein the step of processing the at least one sensitive portions of the source image includes scrambling the at least one sensitive portions such that the intelligible sensitive information becomes unintelligible.

2. The method of claim 1, wherein the sensitive information in the unintelligible form is adapted to be restored to the intelligible form by reverse-scrambling the at least one sensitive portions in the output image.

3. A method of restoring an image processed by the method of claim 2, comprising the step of:
   retrieving a scrambling arrangement of the plurality of image pixels associated with each of the at least one sensitive portions; and
   reverse-scrambling the at least one sensitive portions in the output image so as to present the sensitive information in the intelligible form.

4. The method of claim 3, further comprising the step of authenticating a user so as to process the steps of retrieving the scrambling arrangement and/or reverse-scrambling the at least one sensitive portions in the output image upon a valid authentication.

5. The method of claim 1, wherein the step of processing the at least one sensitive portions of the source image further comprising the step of recording a scrambling arrangement of a plurality of image pixels associated with each of the at least one sensitive portions, wherein each of the at least one sensitive portions includes an array of partitions each include at least one image pixel.

6. The method of claim 5, wherein the scrambling arrangement is encrypted.

7. The method of claim 5, wherein the scrambling arrangement is stored in metadata or header of the output image.

8. The method of claim 1, further comprising the step of processing a plurality of source images each including the intelligible sensitive information presented on the at least one sensitive portions of each of the source image, wherein the plurality of source images are arranged to combine as a stream of image frames.

9. The method of claim 8, wherein the step of processing the at least one sensitive portions of the source image includes scrambling the at least one sensitive portions on different source images with different scrambling arrangements.

10. The method of claim 8, further comprising the step of encrypting a scrambling arrangement associated with each of the image frames using a plurality of unique encryption keys.

11. The method of claim 1, further comprising the step of identifying the at least one sensitive portions in the source image.

12. The method of claim 1, wherein the intelligible sensitive information includes an identification feature of an object.

13. An image processing system comprising:
    an image processing module arranged to process at least one sensitive portions of a source image with a predetermined redacting method, wherein the at least one sensitive portion is arranged to present intelligible sensitive information; and
    a redacted image generation module arranged to generate an output image including the intelligible sensitive information being transformed into an unintelligible form;
    wherein the sensitive information in the unintelligible form is adapted to be restored to an intelligible form; and
    wherein the image processing module is arranged to scramble the at least one sensitive portions such that the intelligible sensitive information becomes unintelligible.

14. The image processing system of claim 13, wherein the sensitive information in the unintelligible form is adapted to be restored to the intelligible form by reverse-scrambling the at least one sensitive portions in the output image.

15. The image processing system of claim 14, further comprising an image viewer including a reverse-redacting module arranged to retrieve a scrambling arrangement of the plurality of image pixels associated with each of the at least one sensitive portions, and to reverse-scramble the at least one sensitive portions in the output image so as to present the sensitive information in the intelligible form.

16. The image processing system of claim 15, wherein the image viewer further comprising an authorization module arranged to authenticate a user so as to enable the reverse-redacting module to retrieve the scrambling arrangement and/or to reverse-scramble the at least one sensitive portions in the output image upon a valid authentication.

17. The image processing system of claim 13, wherein the redacted image generation module is further arranged to record a scrambling arrangement of an array plurality of image pixels associated with each of the at least one sensitive portions, wherein each of the at least one sensitive portions includes an array of partitions each include at least one image pixel.

18. The image processing system of claim 17, wherein the scrambling arrangement is encrypted.

19. The image processing system of claim 17, wherein the scrambling arrangement is stored in metadata or header of the output image.

20. The image processing system of claim 13, wherein the image processing module is arranged to process a plurality of source images each including the intelligible sensitive information presented on the at least one sensitive portions of each of the source image, wherein the plurality of source images are arranged to combine as a stream of image frames.

21. The image processing system of claim 20, wherein the image processing module is arranged to scramble the at least one sensitive portions on different source images with different scrambling arrangements.

22. The image processing system of claim 20, wherein the redacted image generation module is further arranged to encrypt a scrambling arrangement associated with each of the image frames using a plurality of unique encryption keys.

\* \* \* \* \*